Oct. 12, 1948.   E. M. BUTLER   2,451,067

SELF-ENERGIZING ELECTROLYTIC WATER CORRECTION DEVICE

Filed Oct. 30, 1946

Inventor
EDGAR M. BUTLER
by
Attys.

Patented Oct. 12, 1948

2,451,067

UNITED STATES PATENT OFFICE 2,451,067

SELF-ENERGIZING ELECTROLYTIC WATER CORRECTION DEVICE

Edgar M. Butler, New Orleans, La.

Application October 30, 1946, Serial No. 706,741

6 Claims. (Cl. 204—248)

1

This invention relates to a self-energizing electrolytic water correction device, and more particularly to a device in which the cartridge, or core is enclosed and supported within a sheath formed of closely wound turns of a wire spring, the ends of which are provided with open turns of rapidly increasing diameter and adapted to be easily contracted for mounting within a conduit.

The present invention constitutes an improvement upon the invention disclosed in my copending application Serial No. 626,191, filed November 2, 1945, of which this application is a continuation-in-part. In the parent application the sheath for the core, or cartridge, is formed with closely wound intermediate turns for resiliently and grippingly engaging the cartridge and with loosely wound end turns of increasing diameter to provide helical or volute end springs for mounting the device within a conduit, or the like. In the preferred form of my present invention the end turns are closely spaced longitudinally to provide substantially flat spring helices, more nearly approaching spirals than the volute end springs of my former invention.

Some of the advantages of my present invention are that the provision of relatively flat helical end turns, or spiral end turns, permit the use of a shorter packing box without subjecting the lid of the box to undue spring pressure, and allow the installation of the device in a shorter length of conduit. With the more widely spaced helical end turns of my previous invention, the conduit had to be longer, the larger its diameter, in order to contain the unit, whereas with the flatter helical end turns, or spirals, of my present invention, the conduit length required for the mounting of the device is independent of the diameter of the conduit.

The spring type sheath, in general, has advantages over a solid wall type of sheath in that the spring may be formed in one operation from commercially available wire, with no finishing operations other than the plating and possibly burnishing of the wire necessary. The spring type of sheath is, therefore, cheaper and quicker to make. Likewise, the assembly of a spring type sheath is a simpler operation than positioning and clamping the cartridge, or core, in a solid wall sheath, again resulting in cheaper and more rapid manufacturing.

From a mechanical standpoint, the spring type of sheath has the advantage that the end turns providing the mounting means for the device are integral with the closely wound sheath portion that resiliently and grippingly engages the car-

2 tridge, or core, thereby obviating the necessity of a separate mounting such as is required in the case of a solid wall type of sheath. Furthermore, in the solid wall type of sheath separate springs or clamp bolts are required to maintain mechanical and electrical contact as the cartridge, or core, decomposes, whereas in the case of the spring type sheath, contact is maintained because of the resilient contractible and expansible character of the closely wound intermediate portion of the spring type sheath. Thus, the spring type sheath maintains good electrical contact with the cartridge, or core, during the use of the device without the need of additional clamping means.

From an electrolytic standpoint, the spring type sheath gives a much more effective electrolytic action in that it provides a much more extensive area of both the cartridge, or negative element, and of the sheath, or positive element, resulting in the setting up of a very extensive galvanic cell action. The efficiency of the galvanic action would decrease rapidly if the surfaces of the cartridge, or negative element, and of the spring sheath, or cathode element, were to become separated, but with a coiled spring sheath, no such separation takes place during the use of the device. Instead, the extensive area of contact between the negative element and the positive element is continuously maintained at substantially the original value where a spring type sheath is employed.

It is therefore an important object of this invention to provide a self-energizing electrolytic water correction device possessing the manufacturing, mechanical and electrolytic advantages above outlined.

It is a further important object of this invention to provide a self-energizing electrolytic water correction device in which the positive element is in the form of a spring having intermediate relatively closely wound turns for enclosing and resiliently gripping the negative element, or cartridge, and having relatively flat helical, or spiral, turns of increasing diameter at the end to provide means for mounting the device within a conduit, or the like.

Other and further important objects of this invention will be apparent from the disclosures in the specification and the accompanying drawings.

Figure 1:
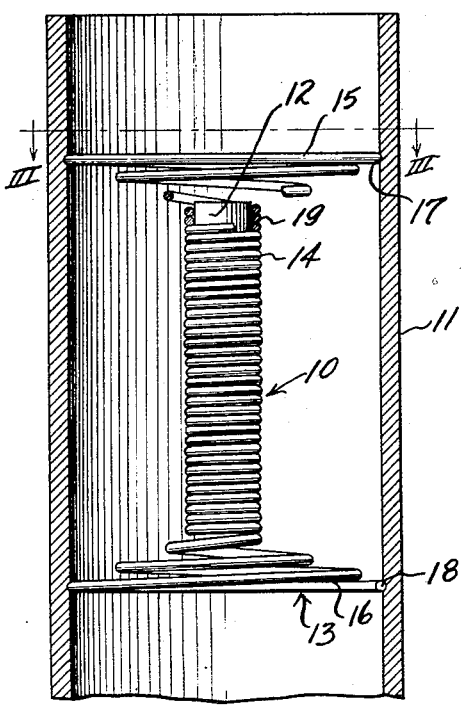
Figure 1 is a longitudinal elevational view of a self-energizing electrolytic water correction device embodying my present invention, with parts broken away and in section, showing the installation of such device in a conduit, a portion of the conduit being shown in longitudinal section.
Figure 3:
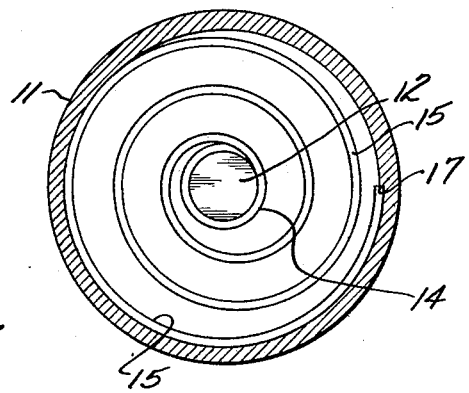
Figure 3 is a sectional view taken substantially along the line III—III of Figure 1.

The reference numeral 10 indicates generally a self-energizing electrolytic water correction device embodying my present invention, illustrated in Figure 1 as installed within a conduit 11. Said device 10 comprises a cartridge 12, which may suitably be a solid bar, cylindrical in form, of a metal or alloy, such as zinc, aluminum or magnesium, to constitute the negative element of the electrolytic device.

A spring type sheath, indicated generally by the reference numeral 13, constitutes the positive element of the electrolytic device and may be formed, for instance, of brass, phosphor bronze, or ordinary bronze, with, preferably, an over-all coating of silver plate. In order to get the maximum differential potential between the negative element and the positive element, it is advantageous that the metal or alloy of the exposed surface of the sheath 13 be at least as low in the electromotive force series as copper.

Figure 4:
Figure 4 is an enlarged sectional view of a wire of square, or rectangular cross section, that might be used in place of the wire of circular cross section illustrated in Figures 1 to 3, inclusive.
Figure 2:
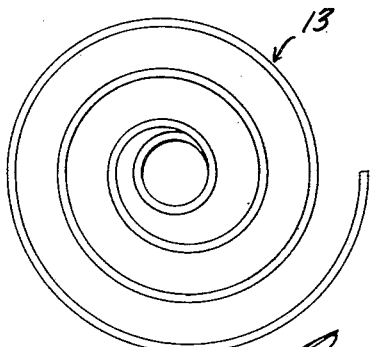
Figure 2 is a top plan view of the device, removed from the conduit, showing the larger overall diameter of the end turns in normal position.

Said sheath 13 comprises an intermediate portion 14 of closely wound turns of wire that may be circular in cross section, as illustrated in Figure 1, or rectangular in cross section, as illustrated in Figure 4. Although the turns 14 are shown in laterally contacting relationship, they may be spaced as much as 0.020 to 0.040 inch, and in any event would be in sufficiently loose lateral contact to permit the seepage of the electrolyte, such as water containing dissolved solids, between the adjacent turns. Before being mounted upon the cartridge 12, the inside diameter of the closely spaced turns 14 would be slightly less than the outside diameter of the cartridge, in the neighborhood of about 1/16 of an inch less for a cartridge of about 1/2 inch diameter, the difference being increased as the diameter of the cartridge is increased. This insures a resilient gripping action between the turns 14 and the outer surface of the cartridge 12, such that said turns resiliently and frictionally grip and retain said cartridge in place within the sheath formed by the closely spaced turns 14.

Said turns 14 extend for substantially the entire length of the cartridge 12, beyond the ends of which the diameters of the turns rapidly increase to provide substantially flat helical, or spiral, end turns 15 and 16. Said end turns 15 and 16 may lie entirely within planes that include or are parallel to the planes of the end faces of the cartridge 12, or may extend as helical turns that are rather closely spaced longitudinally from the end faces of said cartridge. The greatest outside diameter of the end turns 15 and 16 is normally slightly greater than the inside diameter of the conduit, such as the conduit 11, in which the device is to be positioned and retained, so that said end turns have to be contracted when inserting the device in place in the cartridge, after which the end turns expand and resiliently engage the inner wall of the conduit, as indicated at 17 and 18, to hold the device against displacement in the conduit. Since the end turns are open, they afford but little obstruction to the flow of water through the conduit, at the same time leaving the end faces of the cartridge 12 directly exposed to contact with such water.

The conduit 11 may, for instance, represent a section of pipe, or hose, forming a part of the water circulating system of an internal combustion engine, such as that of an automobile. When the device 10 is mounted in such a conduit, it is then exposed to the water flowing therethrough. Whenever such water contains dissolved solids, as is necessarily the case unless distilled water were to be used, there is an electrolytic action set up between the negative element that is constituted by the cartridge 12 and the positive element that is constituted by spring type sheath 13. The greater part of the galvanic action will, of course, occur between the closely wound turns 14 and the cartridge 12. As the result of such electrolytic action, the metal of the cartridge 12 will go into solution in the form of ions, which may be zinc or hydrated zinc ions if the cartridge 12 is formed of zinc. These ions either react or combine with, or replace, ions of the scale forming metals, such as calcium, that may be present in the water of the circulatory system. As a result, a relatively soft sludge of such scale forming ingredients is formed, rather than the relatively hard, adhering scale that forms on the surfaces of the circulatory system, including the pumps, in the absence of a device such as herein described. The presence of my device in the water of a circulatory system also decreases the oxygen-corrosion of the metal parts of system, due to the fact that dissolved oxygen in the water is largely removed by the galvanic action of the device. The internal surfaces of the water jacket, or other heat transfer medium, are thus kept cleaner, with the result that greater heat transfer efficiency is maintained between the engine parts and the water of the circulatory system.

As previously stated, the wire of the spring type sheath 13, instead of being circular, as indicated at 19 (Fig. 1) may be rectangular, as indicated at 20 (Fig. 4). The cartridge 12 may also be polygonal in cross section, rather than circular, but for best results it should be of a cross section closely approximating circular in form. The term "positive" as used herein designates metals positioned below hydrogen in the electromotive force series of metals. The term "negative" as used herein designates metals positioned above hydrogen in the electromotive force series of metals.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A galvanic water correction device comprising a metal core constituting the negative element and a metal spring constituting the positive element, said spring having closely wound helical coils frictionally gripping said core to retain the same and having end coils of increasing diameter in the form of relatively flat helices, the closely wound coils being normally of an inside diameter less than the outside diameter of said core to effect resilient gripping engagement of said core.

2. An electrolytic water correction device comprising a cylindrical bar of zinc and an open-ended helically coiled spring sheath therefor having a surface of a metal at least as low as copper in the electromotive force series, said sheath having closely wound turns of a continuous wire frictionally gripping said bar to retain the same and having longitudinally closely spaced end turn of rapidly increasing diameter for supporting said bar and sheath within a conduit.

3. A self-energizing galvanic water correction device adapted for self-supporting position in a conduit, said device comprising a metallic core constituting the negative element, and metallic core sheathing and supporting means constituting the positive element and consisting of a helically coiled spring formed of a metal providing an effective potential difference with respect to the metal of said core, said spring having closely wound turns resiliently engaging an intermediate portion of said core and having end turns of increased diameter contractible for insertion into a conduit and thereafter expansible into resilient gripping engagement with said conduit.

4. A self-energizing galvanic water correction device comprising a cylindrical metal core constituting the negative element and an open-ended helically coiled metal spring constituting the positive element, said spring having closely wound coils frictionally gripping said core to retain the same against displacement yet expansible to accommodate expansion of said core in use, and said spring having integral end coils of increasing diameter for supporting said device within a conduit.

5. A self-energizing galvanic electrolytic water correction device comprising a metal core constituting the negative element and a jacket constituting the positive element, said jacket consisting of a plurality of helical turns of resilient metal wire tightly wound and closely spaced along substantially the full length of said core and resiliently and frictionally gripping said core to retain the same and provide a support therefor.

6. A self-energizing galvanic water correction device comprising a metal core constituting the negative element and a helically coiled metal spring constituting the positive element, said spring having a closely wound coil frictionally gripping said core to retain the same against displacement yet expansible to accommodate expansion of said core and having end coils of increasing diameter in the form of relatively flat helices.

EDGAR M. BUTLER.

REFERENCES CITED

The following references are of record in the file of this patent:

UNITED STATES PATENTS

| Number | Name | Date |
|---|---|---|
| 577,134 | Harrison | Feb. 16, 1897 |
| 1,970,604 | Henry | Aug. 21, 1934 |
| 2,424,145 | Butler | July 15, 1947 |